(12) United States Patent
Asano et al.

(10) Patent No.: US 12,460,659 B2
(45) Date of Patent: Nov. 4, 2025

(54) HYDRAULIC CYLINDER

(71) Applicant: Komatsu Ltd., Tokyo (JP)

(72) Inventors: Koutaro Asano, Tokyo (JP); Keisuke Tasaki, Tokyo (JP); Yuki Ikezawa, Tokyo (JP)

(73) Assignee: KOMATSU LTD., Tokyo (JP)

( * ) Notice: Subject to any disclaimer, the term of this patent is extended or adjusted under 35 U.S.C. 154(b) by 0 days.

(21) Appl. No.: 18/683,265

(22) PCT Filed: Aug. 10, 2022

(86) PCT No.: PCT/JP2022/030566
§ 371 (c)(1),
(2) Date: Feb. 13, 2024

(87) PCT Pub. No.: WO2023/053737
PCT Pub. Date: Apr. 6, 2023

(65) Prior Publication Data
US 2024/0344535 A1   Oct. 17, 2024

(30) Foreign Application Priority Data

Sep. 30, 2021   (JP) ................. 2021-162097

(51) Int. Cl.
*F15B 15/14*   (2006.01)
(52) U.S. Cl.
CPC ........ *F15B 15/1447* (2013.01); *F15B 15/149* (2013.01)

(58) Field of Classification Search
CPC ................ F15B 15/149; F15B 15/1447; F15B 15/1457; F16J 7/00
See application file for complete search history.

(56) References Cited

U.S. PATENT DOCUMENTS

| 4,791,854 A | 12/1988 | Banicevic |
| 10,145,394 B2 * | 12/2018 | Kobayashi .......... F15B 15/1461 |
| 2016/0160893 A1 | 6/2016 | Kobayashi |

FOREIGN PATENT DOCUMENTS

| JP | 2015-025506 A | 2/2015 |
| JP | 2017-172681 A | 9/2017 |

* cited by examiner

*Primary Examiner* — Nathaniel E Wiehe
*Assistant Examiner* — Daniel S Collins
(74) *Attorney, Agent, or Firm* — Troutman Pepper Locke LLP

(57) ABSTRACT

A hydraulic cylinder includes a cylinder tube, a piston rod that has a rod end portion disposed inside the cylinder tube and moves in an axial direction, a first rod passage that is formed inside the piston rod and connects a hydraulic source and a first opening formed in the rod end portion, a plug that is inserted into the first rod passage through the first opening, and a piston that is fixed to the piston rod in a state of covering at least a part of the plug and partitions an inside of the cylinder tube into a bottom chamber on one side in the axial direction and a head chamber on the other side in the axial direction.

14 Claims, 10 Drawing Sheets

HYDRAULIC CYLINDER

FIELD

The technology disclosed in the present specification relates to a hydraulic cylinder.

BACKGROUND

In the technical field related to hydraulic cylinders, a hydraulic cylinder as disclosed in Patent Literature 1 is known. The hydraulic cylinder disclosed in Patent Literature 1 includes a plug inserted from an opening end opened in a cylinder tube of an in-rod passage.

CITATION LIST

Patent Literature

Patent Literature 1: JP 2015-025506 A

SUMMARY

Technical Problem

When a pressure applied to a plug increases, the plug may be unplugged. In a screw-type plug, which is a known method, it is necessary to perform screw machining or to take measures to prevent slack. Therefore, additional space, parts, and machining are generated, which causes an increase in cost. In addition, since a screw portion has poor cleanability, foreign matter generated during processing cannot be removed in a small-diameter portion such as a plug portion, and there is a high possibility that foreign matter remains, and it has been difficult to stabilize quality.

The technology disclosed in the present specification aims to fix the plug with a simple shape.

Solution to Problem

According to an aspect of the present invention, a hydraulic cylinder comprises: a cylinder tube; a piston rod that has a rod end portion disposed inside the cylinder tube and moves in an axial direction; a first rod passage that is formed inside the piston rod and connects a hydraulic source and a first opening formed in the rod end portion; a plug that is inserted into the first rod passage through the first opening; and a piston that is fixed to the piston rod in a state of covering at least a part of the plug and partitions an inside of the cylinder tube into a bottom chamber on one side in the axial direction and a head chamber on the other side in the axial direction.

Advantageous Effects of Invention

According to the technology disclosed in the present specification, the plug is fixed in a simple shape.

DESCRIPTION OF EMBODIMENTS

Hereinafter, embodiments according to the present disclosure will be described with reference to the drawings, but the present disclosure is not limited to the embodiments. The components of the embodiments described below can be appropriately combined. In addition, some components may not be used.

First Embodiment

Figure 1:
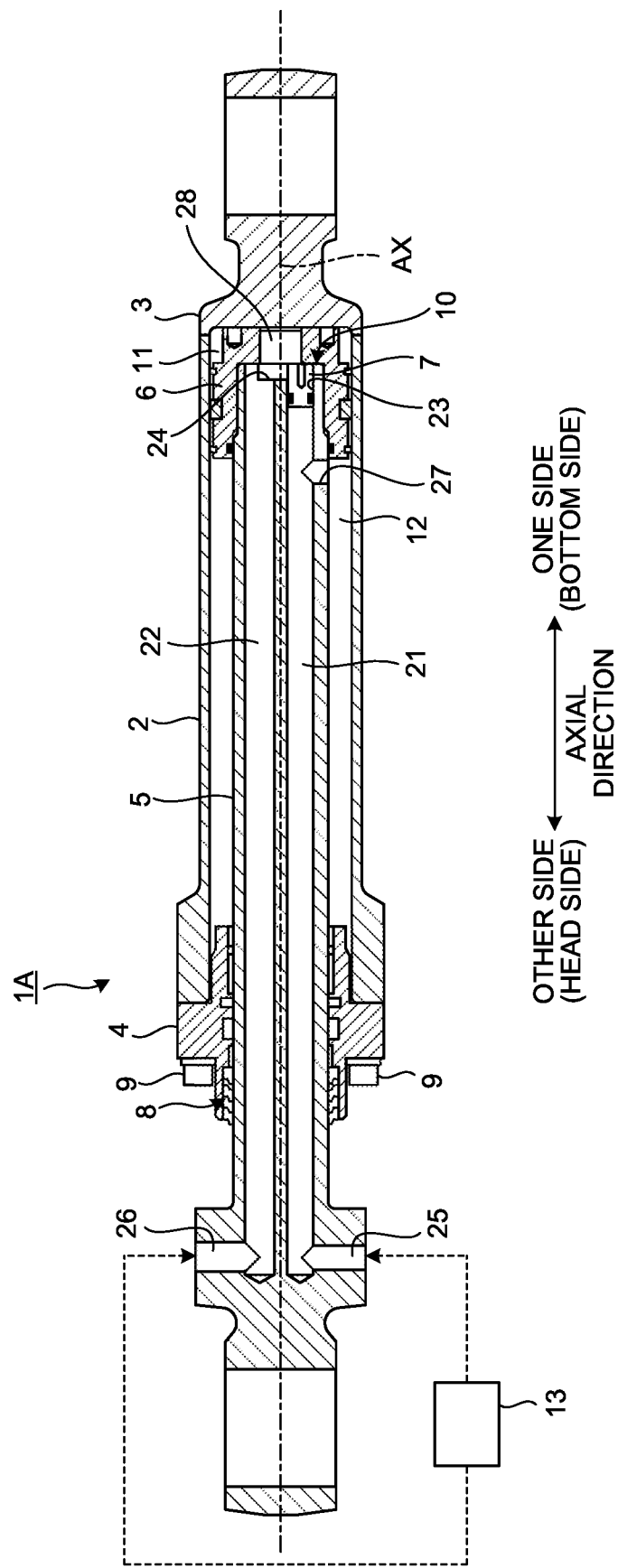
FIG. 1 is a cross-sectional view illustrating a hydraulic cylinder according to a first embodiment.

A first embodiment will be described. FIG. 1 is a cross-sectional view illustrating a hydraulic cylinder 1A according to the present embodiment. As illustrated in FIG. 1, the hydraulic cylinder 1A includes a cylinder tube 2, a bottom 3, a cylinder head 4, a piston rod 5, a piston 6, and a plug 7.

The cylinder tube 2 is a substantially tubular member. The bottom 3 is a substantially columnar member. The cylinder head 4 is a substantially tubular member. The piston rod 5 is a substantially cylindrically columnar member. The piston 6 is a substantially tubular member. A central axis of the cylinder tube 2, a central axis of the bottom 3, a central axis of the cylinder head 4, a central axis of the piston rod 5, and a central axis of the piston 6 substantially coincide with each other.

In the embodiment, the central axis of the cylinder tube 2, the central axis of the bottom 3, the central axis of the cylinder head 4, the central axis of the piston rod 5, and the central axis of the piston 6 are collectively referred to as a central axis AX as appropriate.

In the embodiment, a direction parallel to the central axis AX is appropriately referred to as an axial direction, a radial direction of the central axis AX is appropriately referred to as a radial direction, and a direction around the central axis AX is appropriately referred to as a circumferential direction.

A position on one side or a direction approaching one side in the axial direction is appropriately referred to as one side or a bottom side in the axial direction, and a direction approaching the position on the other side or the other side in the axial direction is appropriately referred to as the other side or the head side in the axial direction. In the radial direction, a position close to or a direction approaching the central axis AX is appropriately referred to as a radial inside, and a position far from or a direction away from the central axis AX is appropriately referred to as a radial outside.

The cylinder tube 2 movably supports the piston 6. The bottom 3 is connected to an end portion on one side in the axial direction of the cylinder tube 2. The cylinder head 4 is connected to the end portion on the other side in the axial direction of the cylinder tube 2. The bottom 3 is welded to the cylinder tube 2. The cylinder head 4 is disposed around the piston rod 5. The cylinder head 4 movably supports the piston rod 5. A plurality of seal members 8 are disposed between the cylinder head 4 and the piston rod 5. The cylinder head 4 is fixed to the cylinder tube 2 by a bolt 9.

The piston rod 5 moves in the axial direction with respect to the cylinder tube 2 and the cylinder head 4. At least a part of the piston rod 5 is disposed inside the cylinder tube 2. The piston rod 5 has a rod end portion 10 on one side in the axial direction. At least the rod end portion 10 of the piston rod 5 is disposed inside the cylinder tube 2.

The piston 6 is fixed to the piston rod 5. The piston 6 partitions the inside of the cylinder tube 2 into a bottom chamber 11 on one side in the axial direction and a head chamber 12 on the other side in the axial direction. The piston 6 is slidably supported on the inner surface of the cylinder tube 2. The piston 6 is movable in the axial direction inside the cylinder tube 2.

A first rod passage 21 and a second rod passage 22 are formed inside the piston rod 5. Each of the first rod passage 21 and the second rod passage 22 is formed to extend in the axial direction. The second rod passage 22 is formed adjacent to the first rod passage 21. In the embodiment, the first rod passage 21 and the second rod passage 22 are substantially parallel. The first rod passage 21 and the second rod passage 22 may be formed inside the piston rod 5, and the first rod passage 21 and the second rod passage 22 may not be parallel to each other.

A first opening 23 and a second opening 24 are formed in the rod end portion 10 disposed inside the cylinder tube 2.

A head-side end portion of the first rod passage 21 is connected to a hydraulic source 13 via a first connection passage 25. A bottom-side end portion of the first rod passage 21 is connected to the first opening 23. The first rod passage 21 connects the hydraulic source 13 and the first opening 23 formed in the rod end portion 10.

A head-side end portion of the second rod passage 22 is connected to the hydraulic source 13 via a second connection passage 26. A bottom-side end portion of the second rod passage 22 is connected to the second opening 24. The second rod passage 22 connects the hydraulic source 13 and the second opening 24 formed in the rod end portion 10.

The plug 7 is inserted into the first rod passage 21 through the first opening 23. The plug 7 closes the first opening 23. The piston 6 is fixed to the piston rod 5. The piston 6 is disposed so as to cover the plug 7 from the bottom side. The piston 6 is fixed to the piston rod 5 in a state of covering at least a part of the plug 7 from the bottom side. The piston 6 can come into contact with at least a part of the plug 7. In the embodiment, a slight gap is formed between the plug 7 and the piston 6. The plug 7 slides in the axial direction by the hydraulic pressure acting on the plug 7. When the hydraulic pressure of the first rod passage 21 on the head side of the plug 7 is higher than the hydraulic pressure on the bottom side, the plug 7 abuts on an abutment surface 63 (see FIG. 2 and the like) of the piston 6 described later. When the hydraulic pressure of the first rod passage 21 on the head side of the plug 7 is lower than the hydraulic pressure on the bottom side, the plug 7 abuts on a support surface 213 (see FIG. 2 and the like) of the piston rod 5 described later.

The piston rod 5 has a head chamber passage 27 connecting the first rod passage 21 and the head chamber 12 on the head side of the piston 6.

The piston 6 has a bottom chamber passage 28 connecting the second rod passage 22 and the bottom chamber 11.

In the embodiment, the hydraulic oil supplied from the hydraulic source 13 to the first rod passage 21 is supplied to the head chamber 12 via the head chamber passage 27. The hydraulic oil supplied from the hydraulic source 13 to the second rod passage 22 is supplied to the bottom chamber 11 via the bottom chamber passage 28.

The piston rod 5 moves in the axial direction so as to be removed from the cylinder tube 2 or inserted into the cylinder tube 2. When the piston rod 5 moves so as to be removed from the cylinder tube 2, the hydraulic cylinder 1A extends. When the piston rod 5 moves so as to be inserted into the cylinder tube 2, the hydraulic cylinder 1A contracts. When the piston rod 5 moves to the head side, the hydraulic cylinder 1A extends. When the piston rod 5 moves to the bottom side, the hydraulic cylinder 1A contracts. When the hydraulic oil is supplied to the bottom chamber 11, the hydraulic cylinder 1A extends. When the hydraulic oil is supplied to the head chamber 12, the hydraulic cylinder 1A contracts.

Figure 2:
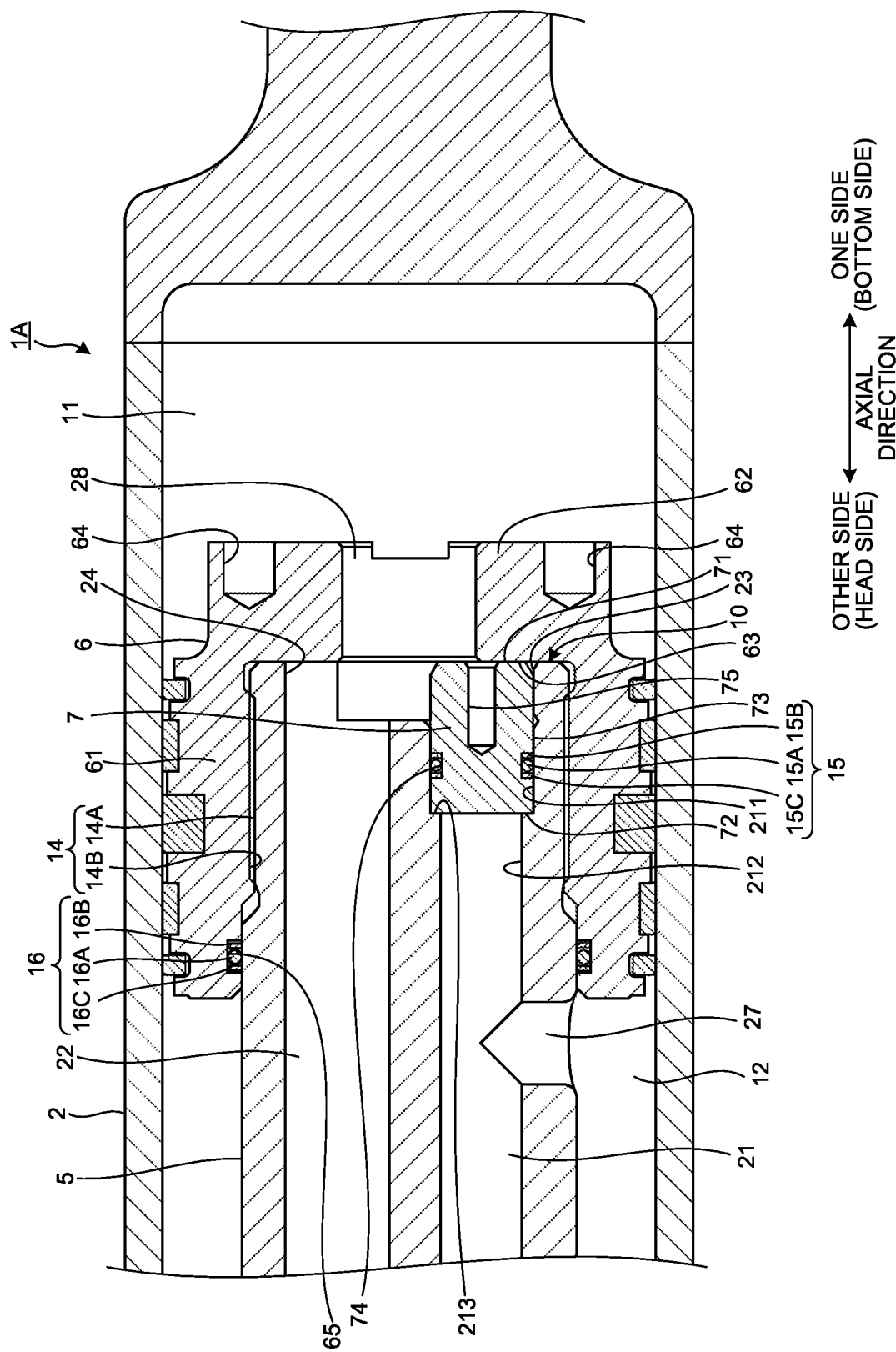
FIG. 2 is a cross-sectional view illustrating a part of the hydraulic cylinder according to the first embodiment.
Figure 3:
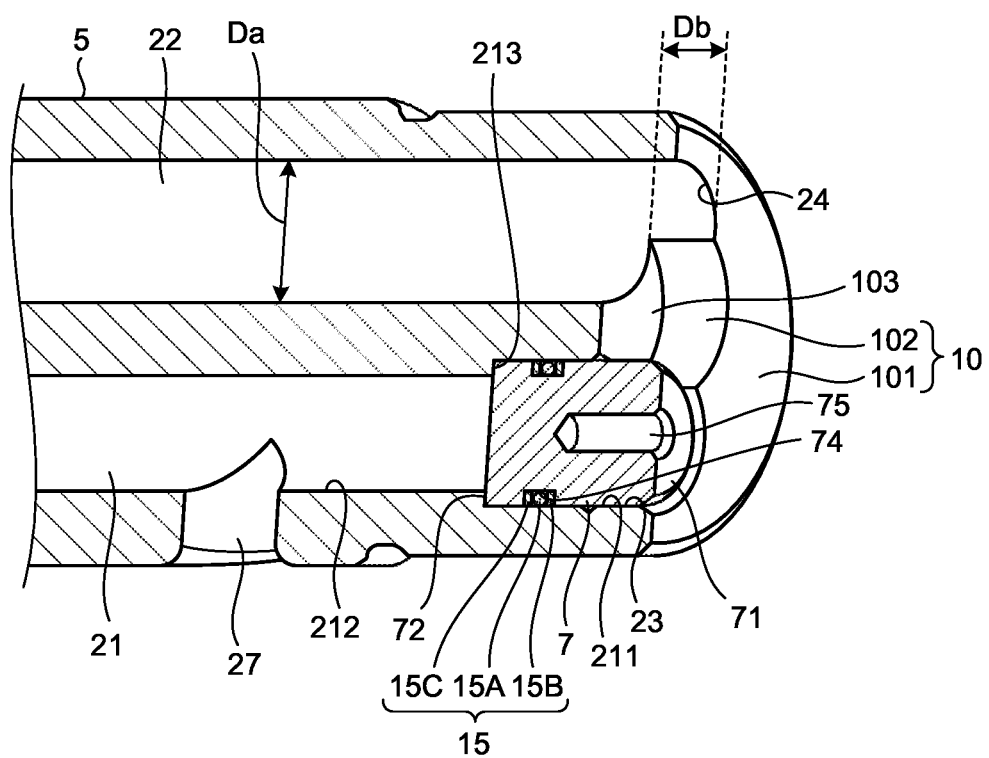
FIG. 3 is a perspective cross-sectional view illustrating a part of a piston rod and a plug according to the first embodiment.
Figure 4:
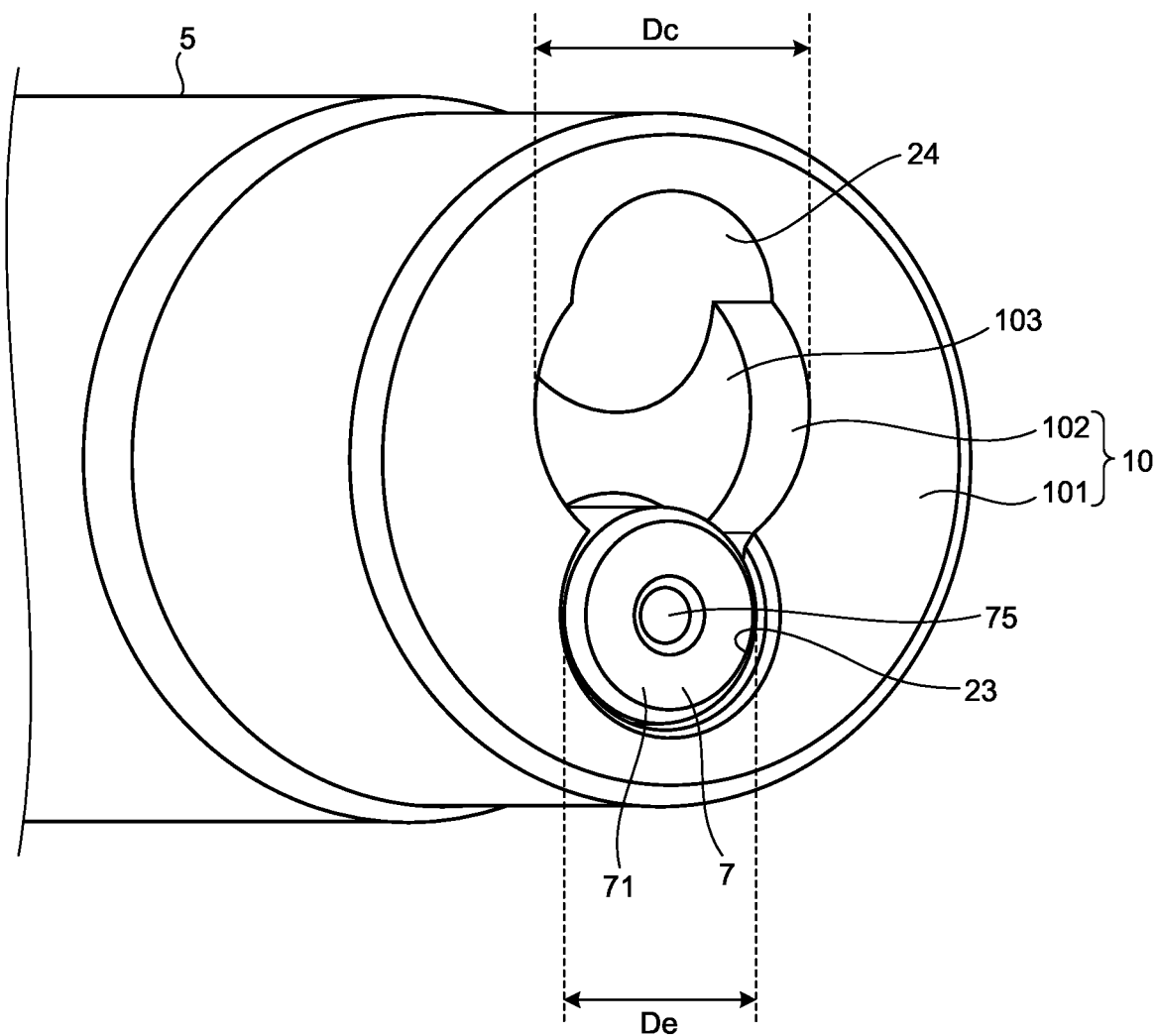
FIG. 4 is a perspective view illustrating a part of the piston rod and the plug according to the first embodiment.
Figure 5:
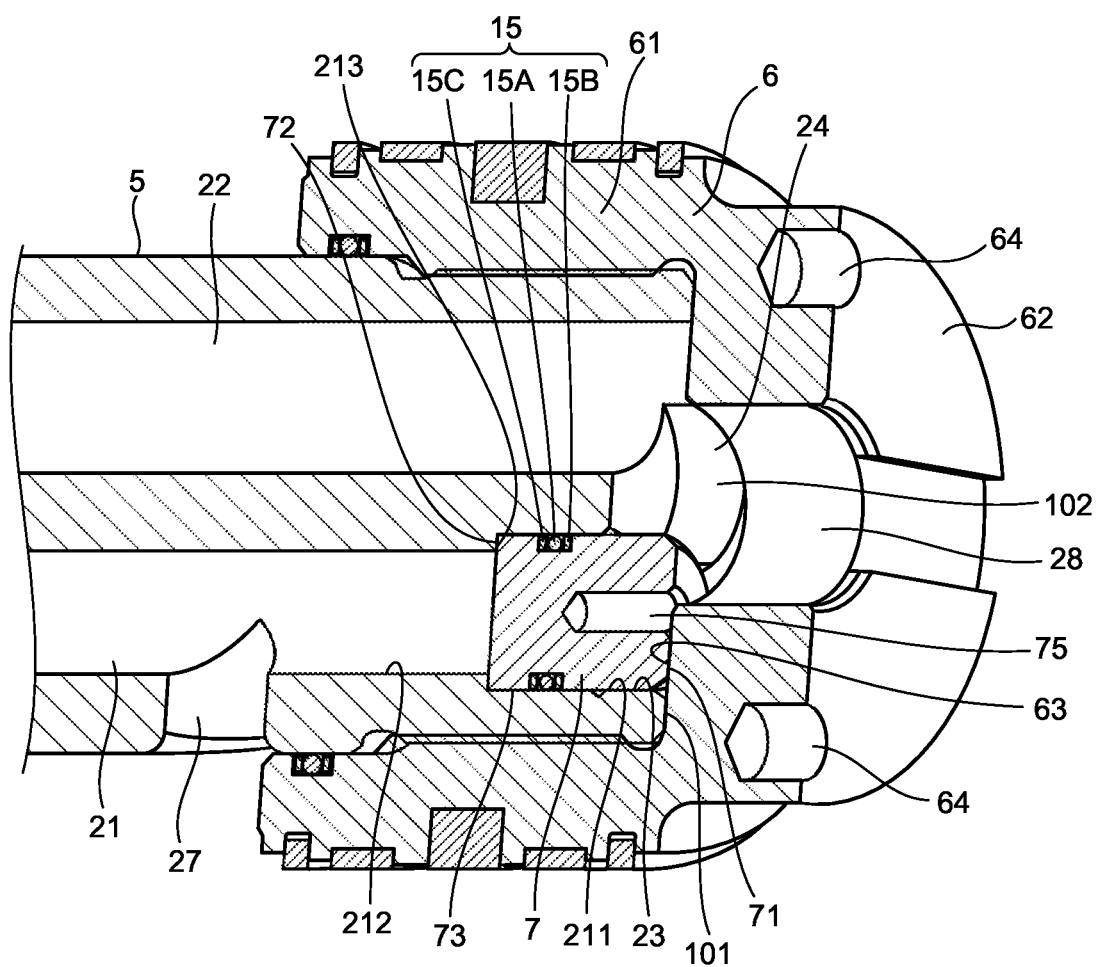
FIG. 5 is a perspective cross-sectional view illustrating a part of the piston rod, the plug, and a piston according to the first embodiment.
Figure 6:
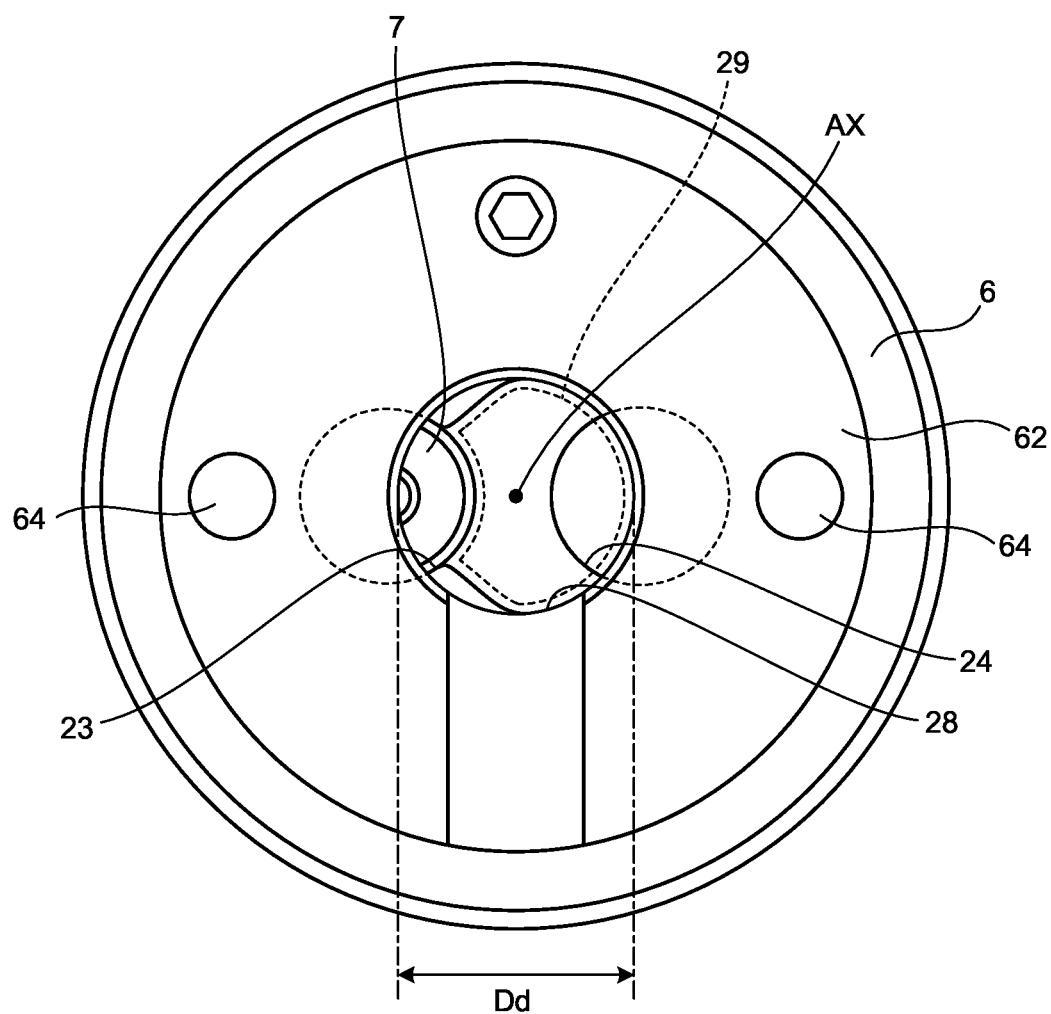
FIG. 6 is a view of the piston rod, the plug, and the piston according to the first embodiment as viewed from a bottom side.

FIG. 2 is a cross-sectional view illustrating a part of the hydraulic cylinder 1A according to the present embodiment. FIG. 3 is a perspective cross-sectional view illustrating a part of the piston rod 5 and the plug 7 according to the present embodiment. FIG. 4 is a perspective view illustrating a part of the piston rod 5 and the plug 7 according to the present embodiment. FIG. 5 is a perspective cross-sectional view illustrating a part of the piston rod 5, the plug 7, and the piston 6 according to the present embodiment. FIG. 6 is a view of the piston rod 5, the plug 7, and the piston 6 according to the present embodiment as viewed from the bottom side.

The piston 6 has a tubular portion 61 and a facing portion 62. The tubular portion 61 is disposed around the piston rod 5. A screw thread 14A is provided on the outer peripheral surface of the piston rod 5. A screw groove 14B is provided on the inner peripheral surface of the tubular portion 61. The screw thread 14A and the screw groove 14B are coupled. The piston rod 5 and the piston 6 are fixed via a screw portion 14 including the screw thread 14A and the screw groove 14B.

The facing portion 62 is connected to a bottom-side end portion of the tubular portion 61. The facing portion 62 is disposed on the bottom side of the piston rod 5 and the plug 7. The facing portion 62 faces the rod end portion 10.

The plug 7 has a first plug end surface 71 facing the bottom side, a second plug end surface 72 facing the head side, and an outer peripheral surface 73.

The first plug end surface 71 abuts on an abutment surface 63 defined on at least a part of the piston 6. The second plug end surface 72 abuts on the support surface 213 disposed inside the first rod passage 21. The abutment surface 63 faces the head side. The support surface 213 faces the bottom side.

The abutment surface 63 is disposed on the facing portion 62.

The first rod passage 21 includes a large-diameter portion 211 connected to the first opening 23 and a small-diameter portion 212 disposed on the head side with respect to the large-diameter portion 211. The support surface 213 is disposed at a boundary between the large-diameter portion 211 and the small-diameter portion 212.

A seal member 15 is disposed between the outer peripheral surface 73 of the plug 7 and the inner peripheral surface of the large-diameter portion 211. The seal member 15 is disposed in a groove 74 provided in the outer peripheral surface 73. The seal member 15 includes an O-ring 15A, a backup ring 15B disposed on the bottom side of the O-ring 15A, and a backup ring 15C disposed on the head side of the O-ring 15A.

A surface roughness of the inner peripheral surface of the large-diameter portion 211 is smaller than a surface roughness of the inner peripheral surface of the small-diameter portion 212. Note that it is sufficient that sealability between the seal member 15 and the inner peripheral surface of the large-diameter portion 211 can be secured, and the surface roughness of the inner peripheral surface of the large-diameter portion 211 may be the same as the surface roughness of the inner peripheral surface of the small-diameter portion 212 or may be larger than the surface roughness of the inner peripheral surface of the small-diameter portion 212.

A seal member 16 is disposed at a boundary between the tubular portion 61 and the piston rod 5 on the head side with respect to the screw portion 14. The seal member 16 is disposed in a groove 65 provided on the inner peripheral surface of the tubular portion 61. The seal member 16 includes an O-ring 16A, a backup ring 16B disposed on the bottom side of the O-ring 16A, and a backup ring 16C disposed on the head side of the O-ring 16A. The seal member 16 may be omitted.

When the piston 6 is fixed to the piston rod 5, the piston 6 is rotated in a state where a tool is inserted into a tool insertion hole 64 provided in the facing portion 62 of the piston 6. The facing portion 62 moves to the head side by the relative rotation of the tubular portion 61 and the piston rod 5. The facing portion 62 is disposed so as to cover the plug 7 from the bottom side. In the embodiment, a slight gap is formed between the first plug end surface 71 of the plug 7 and the abutment surface 63 of the piston 6. The plug 7 slides in the axial direction by the hydraulic pressure acting on the plug 7. When the hydraulic pressure of the first rod passage 21 on the head side of the plug 7 is higher than the hydraulic pressure on the bottom side, the plug 7 abuts on the abutment surface 63 of the piston 6. When the hydraulic pressure of the first rod passage 21 on the head side of the plug 7 is lower than the hydraulic pressure on the bottom side, the plug 7 abuts on the support surface 213 of the piston rod 5. Further, the facing portion 62 comes into contact with at least a part of the rod end portion 10.

When the plug 7 is pulled out from the first rod passage 21, a tool is inserted into the tool insertion hole 75.

As illustrated in FIGS. 3, 4, and 5, the rod end portion 10 includes a rod end surface 101 facing the bottom side and a recessed portion 102 provided in the rod end surface. At least a part of the first opening 23 is provided on the rod end surface 101. At least a part of the first opening 23 is provided inside the recessed portion 102. At least a part of the first opening 23 is provided on a bottom surface 103 of the recessed portion 102 facing the bottom side. That is, at least a part of the first opening 23 is provided so as to be exposed to the recessed portion 102 and the bottom surface 103. At least a part of the second opening 24 is provided on the rod end surface 101. At least a part of the second opening 24 is provided inside the recessed portion 102. At least a part of the second opening 24 is provided on the bottom surface 103 of the recessed portion 102 facing the bottom side.

Note that the first opening 23 may not be exposed to the recessed portion 102 or may not be exposed to the bottom surface 103.

As illustrated in FIG. 6, the bottom chamber passage 28 and at least a part of the plug 7 overlap each other in a plane orthogonal to the central axis AX. In a plane orthogonal to the central axis AX, a range of the bottom chamber passage 28 through which the hydraulic oil can pass is a non-overlapping portion 29 obtained by removing the plug 7 and the rod end surface 101 from the bottom chamber passage 28 as illustrated in FIG. 6. An area of the non-overlapping portion 29 is 80% or more of a cross-sectional area of the second rod passage 22.

For example, as illustrated in FIGS. 3, 4, and 6, in the embodiment, a diameter Da of the second rod passage 22 is 20 [mm], a depth Db of the recessed portion 102 is 11 [mm], a diameter Dc of the recessed portion 102 is 27.5 [mm], and a diameter Dd of the bottom chamber passage 28 is 26 [mm]. The outer diameter De of the plug 7 is 20 [mm].

As described above, the hydraulic cylinder 1A includes the cylinder tube 2, the piston rod 5 having the rod end portion 10 disposed inside the cylinder tube 2 and moving in the axial direction, the first rod passage 21 formed inside the piston rod 5 and connecting the hydraulic source 13 and the first opening 23 formed in the rod end portion 10, the plug 7 inserted into the first rod passage 21 through the first opening 23, and the piston 6 fixed to the piston rod 5 in a state of being in contact with at least a part of the plug 7 and partitioning the inside of the cylinder tube 2 into the bottom chamber 11 on one side in the axial direction and the head chamber 12 on the other side in the axial direction.

According to an embodiment, the plug 7 is covered by at least a part of the piston 6. As described above, when the plug 7 is movable in the axial direction, the plug 7 comes into contact with the piston 6 when the plug 7 moves to the bottom side. Accordingly, even when the pressure applied to the plug 7 increases, the plug 7 is prevented from coming off from the first rod passage 21.

The plug 7 has the first plug end surface 71 facing one side in the axial direction and the second plug end surface 72 facing the other side in the axial direction. The first plug end surface 71 abuts on an abutment surface 63 defined on at least a part of the piston 6. The second plug end surface 72 abuts on the support surface 213 disposed inside the first rod passage 21. The plug 7 is disposed between the abutment surface 63 of the piston 6 and the support surface 213 of the piston rod 5.

The first rod passage 21 includes the large-diameter portion 211 connected to the first opening 23 and the small-diameter portion 212 disposed on the other side in the axial direction with respect to the large-diameter portion 211. The support surface 213 is disposed at a boundary between the large-diameter portion 211 and the small-diameter portion 212.

The seal member 15 is disposed between the outer peripheral surface 73 of the plug 7 and the inner peripheral surface of the large-diameter portion 211. This prevents the hydraulic oil flowing through the first rod passage 21 from flowing out of the first opening 23.

The surface roughness of the inner peripheral surface of the large-diameter portion 211 is smaller than the surface roughness of the inner peripheral surface of the small-diameter portion 212. As a result, damage or deterioration of the seal member 15 is suppressed. Note that it is sufficient that sealability between the seal member 15 and the inner peripheral surface of the large-diameter portion 211 can be secured, and the surface roughness of the inner peripheral surface of the large-diameter portion 211 may be the same as the surface roughness of the inner peripheral surface of the small-diameter portion 212 or may be larger than the surface roughness of the inner peripheral surface of the small-diameter portion 212.

The piston 6 includes the tubular portion 61 disposed around the piston rod 5 and having the screw groove 14B coupled to the screw thread 14A provided on the piston rod 5, and the facing portion 62 disposed on one side in the axial direction with respect to the piston rod 5. The abutment surface 63 is disposed on the facing portion 62. The facing portion 62 moves to the other side in the axial direction by the relative rotation of the tubular portion 61 and the piston rod 5. As a result, since the plug 7 and the facing portion 62 face each other, the plug 7 is prevented from coming off from the first rod passage 21.

The facing portion 62 is in contact with at least a portion of the rod end portion 10. This stabilizes the fixing between the piston rod 5 and the piston 6.

The piston rod 5 has the head chamber passage 27 connecting the first rod passage 21 and the head chamber 12 on the other side in the axial direction with respect to the piston 6. As a result, the hydraulic oil flowing through the first rod passage 21 is supplied to the head chamber 12 via the head chamber passage 27.

The second rod passage 22 connecting the hydraulic source 13 and the second opening 24 formed in the rod end portion 10 is formed inside the piston rod 5. The piston 6 is provided with the bottom chamber passage 28 connecting the second rod passage 22 and the bottom chamber 11. As a result, the hydraulic oil flowing through the second rod passage 22 is supplied to the bottom chamber 11 via the bottom chamber passage 28.

The rod end portion 10 includes the rod end surface 101 facing one side in the axial direction and the recessed portion 102 provided in the rod end surface 101. At least a part of the second opening 24 is provided inside the recessed portion 102. The recessed portion 102 reduces a pressure loss of the hydraulic oil flowing from the second opening 24 to the bottom chamber 11 via the bottom chamber passage 28.

Second Embodiment

A second embodiment will be described. In the following description, the same or equivalent components as those of the above-described embodiment are denoted by the same reference numerals, and the description of the components is simplified or omitted.

Figure 7:
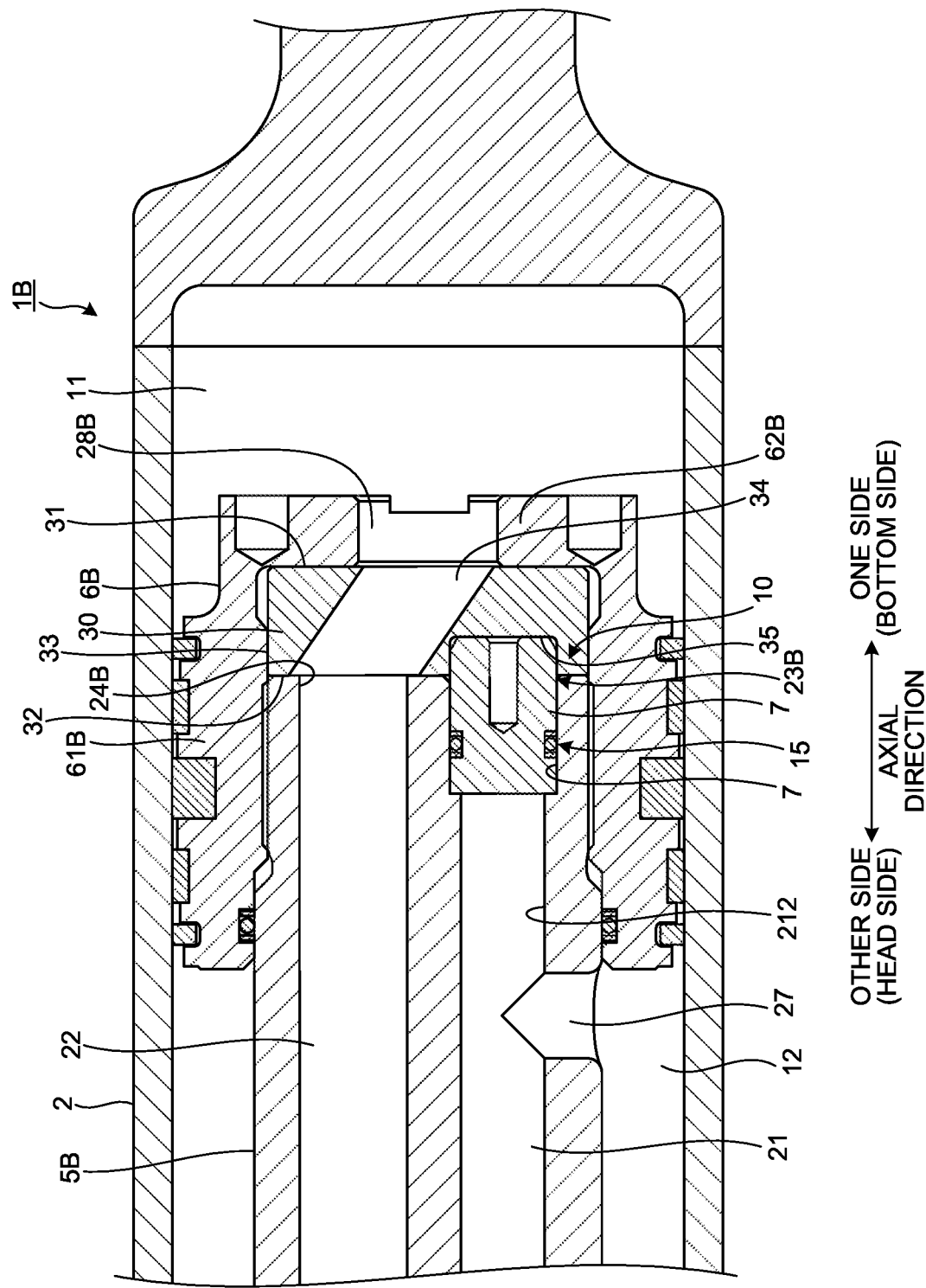
FIG. 7 is a cross-sectional view illustrating a part of a hydraulic cylinder according to a second embodiment.

FIG. 7 is a cross-sectional view illustrating a part of a hydraulic cylinder 1B according to the present embodiment. As illustrated in FIG. 7, the hydraulic cylinder 1B includes a plate 30 disposed between the rod end portion 10 and a piston 6B.

Figure 8:
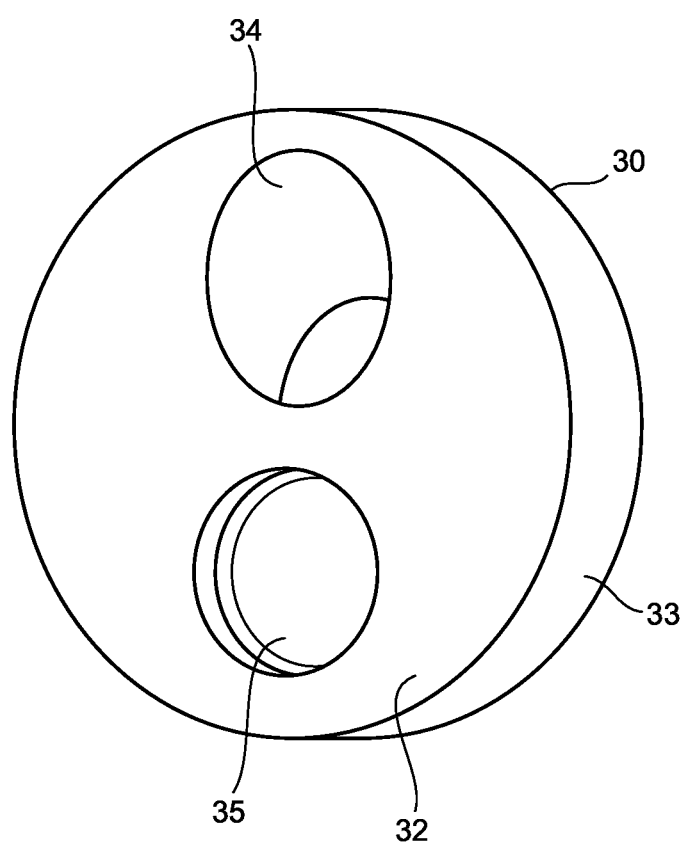
FIG. 8 is a perspective view illustrating a plate according to the second embodiment.

FIG. 8 is a perspective view illustrating the plate 30 according to the present embodiment. As illustrated in FIGS. 7 and 8, the plate 30 has a first plate end surface 31, a second plate end surface 32, and an outer peripheral surface 33.

A piston rod 5B has a first rod passage 21 and a second rod passage 22. A first opening 23B and a second opening 24B are formed in the rod end portion 10. The plug 7 is inserted into the first opening 23B.

The piston 6B has a tubular portion 61B and a facing portion 62B. The facing portion 62B is provided with a bottom chamber passage 28B.

The plate 30 has a connection passage 34 connecting the second opening 24B and the bottom chamber passage 28B. The plate 30 has a recessed portion 35 in which the plug 7 is disposed.

The first plate end surface 31 is in contact with the facing portion 62B. The second plate end surface 32 is in contact with the rod end portion 10 of the piston rod 5B. The outer peripheral surface 33 is in contact with at least a part of the inner peripheral surface of the tubular portion 61B. By inserting the plug 7 into each of the first opening 23B of the piston rod 5B and the recessed portion 35 of the plate 30, the rotation of the plate 30 is suppressed.

The hydraulic oil flowing through the second rod passage 22 flows through the connection passage 34 of the plate 30 and then is supplied to the bottom chamber 11 via the bottom chamber passage 28B.

As described above, according to the present embodiment, the plate 30 having the connection passage 34 is disposed between the rod end portion 10 of the piston rod 5B and the piston 6B. The connection passage 34 is inclined with respect to the central axis AX so as to connect the second opening 24B and the bottom chamber passage 28B. The pressure loss of the hydraulic oil is reduced by the connection passage 34.

Third Embodiment

A third embodiment will be described. In the following description, the same or equivalent components as those of the above-described embodiment are denoted by the same reference numerals, and the description of the components is simplified or omitted.

Figure 9:
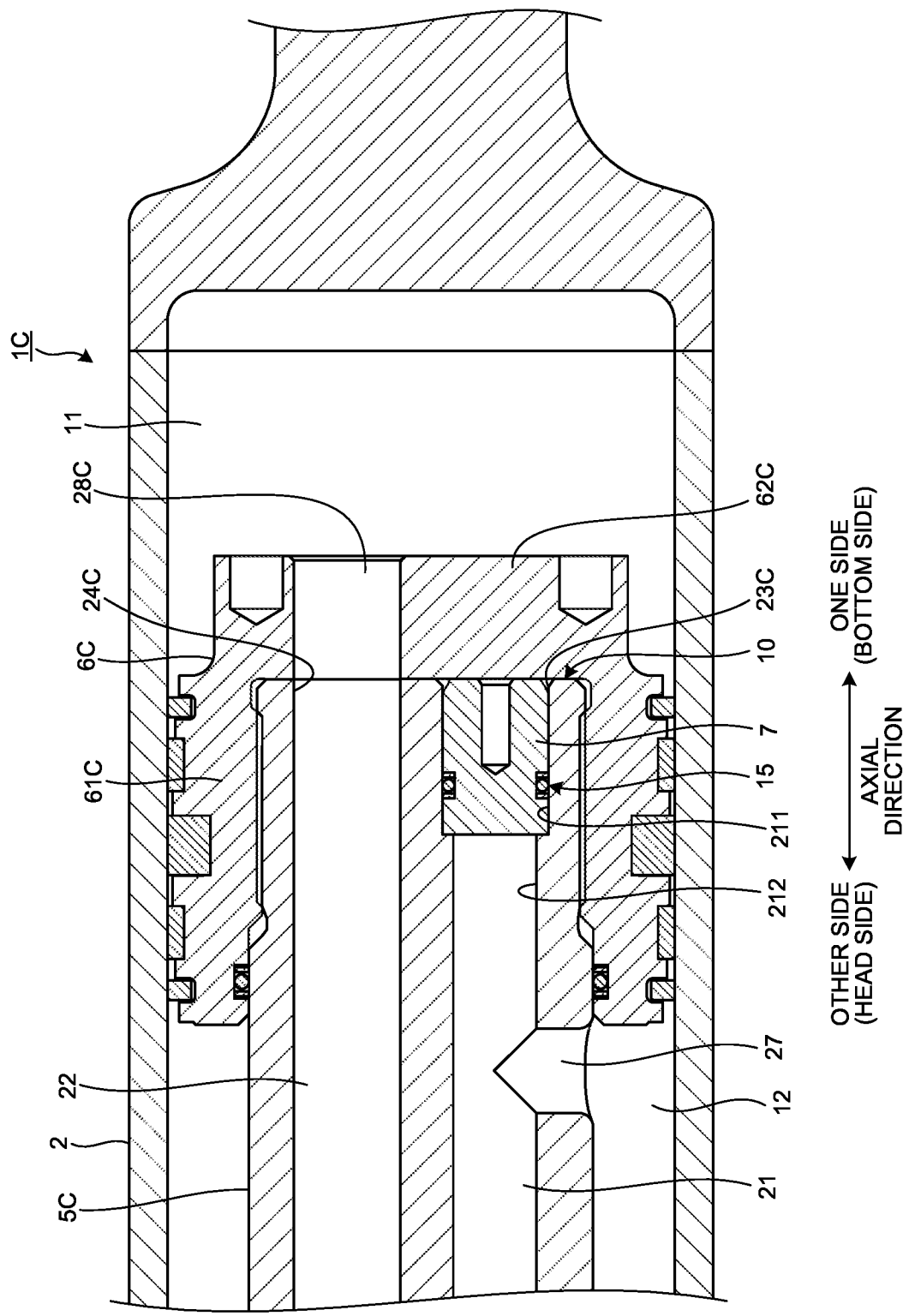
FIG. 9 is a cross-sectional view illustrating a part of a hydraulic cylinder according to a third embodiment.
Figure 10:
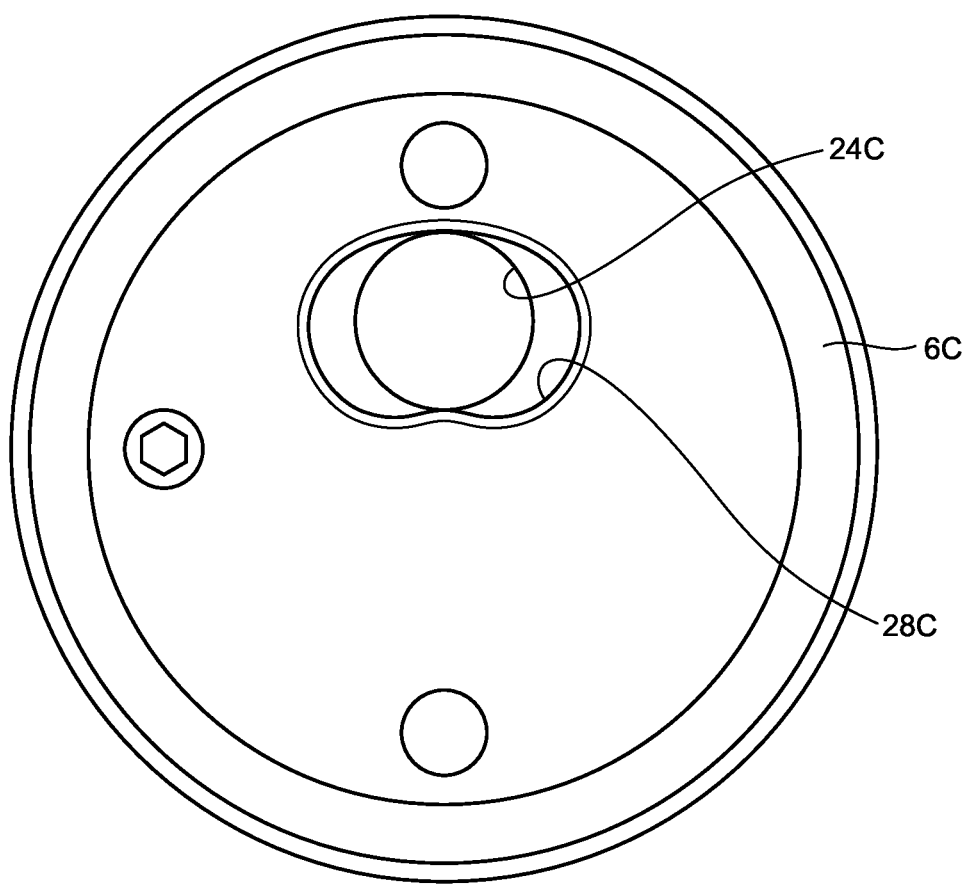
FIG. 10 is a view of a piston rod and a piston according to the third embodiment as viewed from a bottom side.

FIG. 9 is a cross-sectional view illustrating a part of a hydraulic cylinder 1C according to the present embodiment. FIG. 10 is a view of a piston rod 5C and a piston 6C according to the present embodiment as viewed from the bottom side.

As illustrated in FIGS. 9 and 10, the piston rod 5C has a first rod passage 21 and a second rod passage 22. A first opening 23C and a second opening 24C are formed in the rod end portion 10. The plug 7 is inserted into the first opening 23C.

The piston 6C has a tubular portion 61C and a facing portion 62C. The facing portion 62C is provided with a bottom chamber passage 28C.

In a plane orthogonal to the central axis AX of the cylinder tube 2, the second opening 24C overlaps at least a part of the bottom chamber passage 28C.

The hydraulic oil flowing through the second rod passage 22 is supplied to the bottom chamber 11 via the bottom chamber passage 28B.

As described above, according to the present embodiment, the bottom chamber passage 28C is formed at a position shifted from the center of the facing portion 62C, and the second opening 24C and at least a part of the bottom chamber passage 28C overlap each other. As a result, the pressure loss of the hydraulic oil is reduced.

REFERENCE SIGNS LIST

1A HYDRAULIC CYLINDER
1B HYDRAULIC CYLINDER
1C HYDRAULIC CYLINDER
2 CYLINDER TUBE
3 BOTTOM
4 CYLINDER HEAD
5 PISTON ROD
5B PISTON ROD
5C PISTON ROD
6 PISTON
6B PISTON
6C PISTON
7 PLUG
8 SEAL MEMBER
9 BOLT
10 ROD END PORTION

11 BOTTOM CHAMBER
12 HEAD CHAMBER
13 HYDRAULIC SOURCE
14 SCREW PORTION
14A SCREW THREAD
14B SCREW GROOVE
15 SEAL MEMBER
15A O-RING
15B BACKUP RING
15C BACKUP RING
16 SEAL MEMBER
16A O-RING
16B BACKUP RING
16C BACKUP RING
21 FIRST ROD PASSAGE
22 SECOND ROD PASSAGE
23 FIRST OPENING
23B FIRST OPENING
23C FIRST OPENING
24 SECOND OPENING
24B SECOND OPENING
24C SECOND OPENING
25 FIRST CONNECTION PASSAGE
26 SECOND CONNECTION PASSAGE
27 HEAD CHAMBER PASSAGE
28 BOTTOM CHAMBER PASSAGE
28B BOTTOM CHAMBER PASSAGE
29 NON-OVERLAPPING PORTION
30 PLATE
31 FIRST PLATE END SURFACE
32 SECOND PLATE END SURFACE
33 OUTER PERIPHERAL SURFACE
34 CONNECTION PASSAGE
35 RECESSED PORTION
61 TUBULAR PORTION
61B TUBULAR PORTION
61C TUBULAR PORTION
62 FACING PORTION
62B FACING PORTION
62C FACING PORTION
63 ABUTMENT SURFACE
64 TOOL INSERTION HOLE
65 GROOVE
71 FIRST PLUG END SURFACE
72 SECOND PLUG END SURFACE
73 OUTER PERIPHERAL SURFACE
74 GROOVE
75 TOOL INSERTION HOLE
101 ROD END SURFACE
102 RECESSED PORTION
103 BOTTOM SURFACE
211 LARGE-DIAMETER PORTION
212 SMALL-DIAMETER PORTION
213 SUPPORT SURFACE
AX CENTRAL AXIS

The invention claimed is:

1. A hydraulic cylinder comprising:
a cylinder tube;
a piston rod that has a rod end portion disposed inside the cylinder tube and moves in an axial direction;
a first rod passage that is formed inside the piston rod and connects a hydraulic source and a first opening formed in the rod end portion;
a plug that is inserted into the first rod passage through the first opening; and
a piston that is fixed to the piston rod in a state of covering from one side in the axial direction at least a part of the plug and partitions an inside of the cylinder tube into a bottom chamber on one side in the axial direction and a head chamber on the other side in the axial direction.

2. The hydraulic cylinder according to claim 1, wherein, the plug has a first plug end surface facing one side in the axial direction and a second plug end surface facing the other side in the axial direction,
the first plug end surface is in contact with an abutment surface defined on at least a part of the piston, and
the second plug end surface is in contact with a support surface disposed inside the first rod passage.

3. The hydraulic cylinder according to claim 2, wherein the first rod passage includes a large-diameter portion connected to the first opening and a small-diameter portion disposed on the other side in the axial direction with respect to the large-diameter portion, and
the support surface is disposed at a boundary between the large-diameter portion and the small-diameter portion.

4. The hydraulic cylinder according to claim 3, further comprising
a seal member disposed between an outer peripheral surface of the plug and an inner peripheral surface of the large-diameter portion.

5. The hydraulic cylinder according to claim 4, wherein a surface roughness of the inner peripheral surface of the large-diameter portion is smaller than a surface roughness of an inner peripheral surface of the small-diameter portion.

6. The hydraulic cylinder according to claim 2, wherein the piston includes a tubular portion that is disposed around the piston rod and has a screw groove coupled to a screw thread provided on the piston rod, and a facing portion disposed on one side in the axial direction with respect to the piston rod, and
the abutment surface is disposed on the facing portion.

7. The hydraulic cylinder according to claim 6, wherein the facing portion is in contact with at least a portion of the rod end portion.

8. The hydraulic cylinder according to claim 1, wherein the piston rod includes a head chamber passage connecting the first rod passage and the head chamber on the other side in the axial direction with respect to the piston.

9. The hydraulic cylinder according to claim 1, further comprising:
a second rod passage that is formed inside the piston rod and connects a hydraulic source and a second opening formed in the rod end portion; and
a bottom chamber passage that is provided in the piston and connects the second rod passage and the bottom chamber.

10. The hydraulic cylinder according to claim 9, wherein the rod end portion includes a rod end surface facing one side in the axial direction and a recessed portion provided in the rod end surface, and
at least a part of the second opening is provided inside the recessed portion.

11. The hydraulic cylinder according to claim 9, further comprising
a plate arranged between the rod end portion and the piston, wherein
the plate includes a connection passage connecting the second opening and the bottom chamber passage.

12. The hydraulic cylinder according to claim 9, wherein the second opening and at least a part of the bottom chamber passage overlap each other in a plane orthogonal to a central axis of the cylinder tube.

13. A hydraulic cylinder comprising:
a cylinder tube;
a piston rod that has a rod end portion disposed inside the cylinder tube and moves in an axial direction;
a first rod passage that is formed inside the piston rod and connects a hydraulic source and a first opening formed in the rod end portion;
a plug that is inserted into the first rod passage through the first opening; and
a piston that is fixed to the piston rod in a state of covering at least a part of the plug and partitions an inside of the cylinder tube into a bottom chamber on one side in the axial direction and a head chamber on the other side in the axial direction, wherein
the piston rod includes a head chamber passage connecting the first rod passage and the head chamber on the other side in the axial direction with respect to the piston.

14. A hydraulic cylinder comprising:
a cylinder tube;
a piston rod that has a rod end portion disposed inside the cylinder tube and moves in an axial direction;
a first rod passage that is formed inside the piston rod and connects a hydraulic source and a first opening formed in the rod end portion;
a plug that is inserted into the first rod passage through the first opening;
a piston that is fixed to the piston rod in a state of covering at least a part of the plug and partitions an inside of the cylinder tube into a bottom chamber on one side in the axial direction and a head chamber on the other side in the axial direction;
a second rod passage that is formed inside the piston rod and connects a hydraulic source and a second opening formed in the rod end portion; and
a bottom chamber passage that is provided in the piston and connects the second rod passage and the bottom chamber.

* * * * *